United States Patent
Seidl et al.

(10) Patent No.: US 12,393,739 B2
(45) Date of Patent: Aug. 19, 2025

(54) INTEGRATED CIRCUIT AND METHOD FOR PROTECTING AN INTEGRATED CIRCUIT AGAINST REVERSE ENGINEERING

(71) Applicant: Infineon Technologies AG, Neubiberg (DE)

(72) Inventors: Stefan Seidl, Munich (DE); Joel Hatsch, Holzkirchen (DE); Artur Wroblewski, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 261 days.

(21) Appl. No.: 17/983,839

(22) Filed: Nov. 9, 2022

(65) Prior Publication Data

US 2023/0153472 A1    May 18, 2023

(30) Foreign Application Priority Data

Nov. 11, 2021   (DE) .......................... 102021129408.8

(51) Int. Cl.
   *G06F 21/75*    (2013.01)

(52) U.S. Cl.
   CPC ................................ *G06F 21/755* (2017.08)

(58) Field of Classification Search
   None
   See application file for complete search history.

(56) References Cited

U.S. PATENT DOCUMENTS

| | | | | |
|---|---|---|---|---|
| 5,566,193 A | * | 10/1996 | Cloonan | ............... H04L 1/0057 714/E11.053 |
| 10,410,980 B2 | | 9/2019 | Kuenemund | |
| 2011/0239002 A1 | | 9/2011 | Beckmann et al. | |
| 2014/0143883 A1 | * | 5/2014 | Shen-Orr | ................ H04L 9/003 726/26 |
| 2015/0006913 A1 | * | 1/2015 | Daniel | ................... G06F 21/602 713/193 |
| 2016/0277178 A1 | * | 9/2016 | Dubeuf | ................. G06F 21/755 |
| 2019/0028263 A1 | * | 1/2019 | Avital | .................... G06F 21/755 |
| 2021/0150027 A1 | * | 5/2021 | Sonntag | ................ G06F 21/556 |
| 2021/0243041 A1 | | 8/2021 | Schat | |

FOREIGN PATENT DOCUMENTS

| | | |
|---|---|---|
| DE | 102018128561 A1 | 5/2019 |
| DE | 102019112583 A1 | 11/2020 |
| DE | 102020106346 A1 | 9/2021 |

* cited by examiner

*Primary Examiner* — Raqiul A Choudhury (74) *Attorney, Agent, or Firm* — Murphy, Bilak & Homiller, PLLC (57) ABSTRACT

A bit generation circuit having a plurality of signal chains, where for each chain, a first input of an input multiplexer is connected to another of the signal chains and the multiplexer is configured so that, if a control signal indicating a normal operating mode is fed to the multiplexer, the multiplexer connects the first input to the path input of the signal chain. The second input of each multiplexer is connected to the output of a bit generation trigger circuit and, for each signal chain, the multiplexer is configured so that, if a control signal indicating a secret generation mode is fed to the multiplexer, it connects the second input to the path input of the signal chain. The bit generation circuit furthermore comprises an arbiter circuit connected to the path outputs of at least two signal chains and configured to output a secret bit depending on their states.

20 Claims, 6 Drawing Sheets

023
INTEGRATED CIRCUIT AND METHOD FOR PROTECTING AN INTEGRATED CIRCUIT AGAINST REVERSE ENGINEERING

TECHNICAL FIELD

The present disclosure relates to integrated circuits and methods for protecting integrated circuits against reverse engineering.

BACKGROUND

The reverse engineering (RE) of integrated circuits (IC) may be regarded as one of the greatest threats for the semiconductor industry because it may be misused by an attacker to steal and/or adopt a circuit design. An attacker who carries out successful reverse engineering of an integrated circuit may manufacture and sell a similar. i.e. cloned, circuit and illegally sell the design or make it public, thus, for example, divulging a competitor's business secrets.

One typical technical countermeasure against the cloning of an integrated circuit, i.e., of a chip, consists in placing secrets (i.e., secret bits) on the chip and designing the chip in such a way that it cannot fulfil its task without knowledge of these secret bits. Such secrets may be very diverse. Typical examples are bits or "camouflage cells" stored in a nonvolatile memory, which may be regarded as advanced TIE cells of high complexity. (See, e.g., U.S. Pat. No. 10,410,980 B2.) What all these secret-carrying circuits having in common is that it is impossible or at least extremely difficult for an attacker (reverse engineer) to read out their content, i.e. to determine the secrets.

In order to further increase the security of a chip, a plurality of partial secrets of different types may be combined in order to produce an even stronger main secret. Since the chip cannot be cloned without knowledge of the main secret, nor can secrets be extracted, the attacker is then forced to extract all partial secrets involved.

On the one hand, the security of a chip against reverse engineering thus improves as the number of partial secrets increases. On the other hand, each partial secret requires chip area. The highly developed camouflage cells, in particular, require a considerable number of gate equivalents per secret. Therefore, increasing security causes additional costs. Moreover, it should be borne in mind that the camouflage cells become more complex and more area-intensive with every new technology node reached.

Concepts and techniques which are more area-efficient and which prevent the reverse engineering of integrated circuits or at least make it more difficult are therefore desirable.

SUMMARY

Disclosed herein are circuits and techniques that address the above issues.

In accordance with some embodiments, an integrated circuit contains a bit generation circuit comprising a plurality of signal chains, wherein each signal chain comprises a path input, a path output and also an input multiplexer having a first data input and a second data input and an output connected to the path input of the signal chain. For each signal chain the first data input of the input multiplexer is connected to another of the signal chains and for each signal chain the input multiplexer is configured in such a way that, if a control signal indicating a normal operating mode is fed to said input multiplexer, said input multiplexer connects the first data input to the path input of the signal chain. The second data input of each input multiplexer is connected to the output of a bit generation trigger circuit and for each signal chain the input multiplexer is configured in such a way that, if a control signal indicating a secret generation mode is fed to said input multiplexer, said input multiplexer connects the second data input to the path input of the signal chain. The bit generation circuit furthermore comprises an arbiter circuit connected to the path outputs of at least two of the signal chains and configured to output at least one predetermined secret bit depending on the states of the at least two signal chains.

In accordance with further embodiments, a method in accordance with the integrated circuit described above is provided.

BRIEF DESCRIPTION OF THE FIGURES

The figures do not render the actual size relationships, but rather are intended to serve to illustrate the principles of the various exemplary embodiments. Various exemplary embodiments are described below with reference to the following figures.

DETAILED DESCRIPTION

The following detailed description refers to the accompanying figures which show details and exemplary embodiments. These exemplary embodiments are described in sufficient detail to enable a person skilled in the art to carry out the invention. Other embodiments are also possible and the exemplary embodiments may be modified structurally, logically and electrically, without departing from the subject matter of the invention. The various exemplary embodiments are not necessarily mutually exclusive. Rather, different embodiments can be combined with one another so as to give rise to new embodiments. In the context of this description, the terms "connected", "attached" and also "coupled" are used to describe both a direct and an indirect connection, a direct or indirect attachment and also a direct or indirect coupling.

Figure 1:
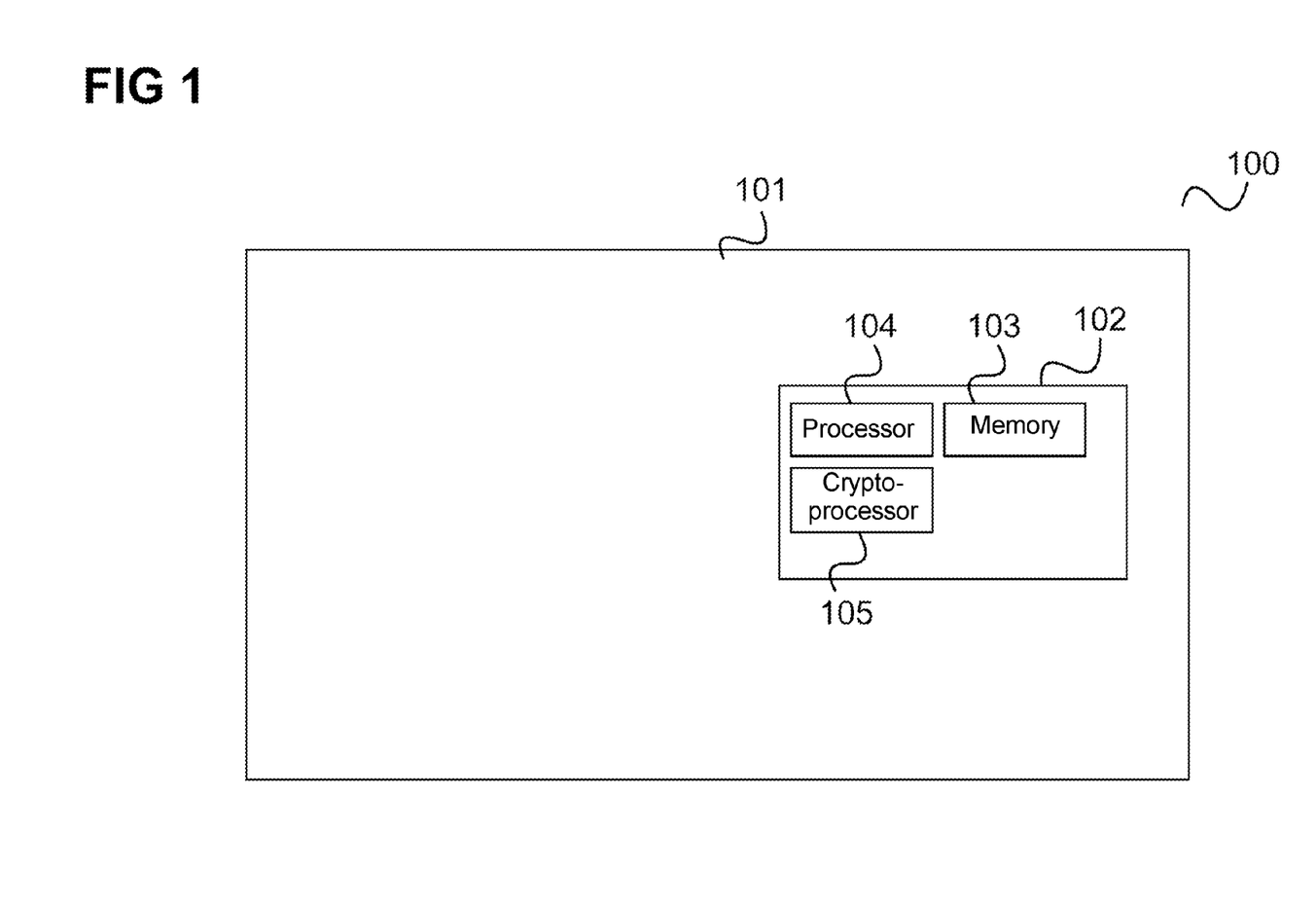
FIG. 1 shows a smart card in accordance with one embodiment.

FIG. 1 shows a smart card 100 in accordance with one embodiment.

The smart card 100 comprises a carrier 101, on which a smart card module 102 is arranged. The smart card module 102 comprises various data processing components, i.e., circuits, such as, for example, a memory 103, a processor 104 or, for example, a dedicated cryptoprocessor 105.

By way of example, the smart card module 102 is intended to be protected against reverse engineering (or else the extraction of secret contents). However, this is intended merely to serve as an example and chips in many different fields of application can be protected against reverse engineering (or the extraction of secret contents) in accordance with exemplary embodiments, e.g., microcontroller chips, e.g., in control devices such as in a vehicle, e.g., in an ECU (electronic control unit), for smart cards having any form factor, communication chips, control chips of various apparatuses such as printers, etc.

For protection against reverse engineering, secret-carrying circuits can be provided on a chip, i.e., circuits which output one or more secret bits and which are camouflaged and/or whose secret is very difficult to determine by reverse engineering because it is based. e.g., on small differences in performance.

However, such secret-carrying circuits require an additional area expenditure on the chip.

Therefore, in accordance with various embodiments, existing structures on the chip, i.e., circuit parts provided on the chip anyway (e.g., for its actual function (i.e., normal operation) or else for shielding against attacks), are used to generate secret bits, wherein only a small number of additional gates are required for implementing this generation of secret bits. This allows a chip to be provided with low additional costs in comparison with the use of additional secret-carrying circuits. Furthermore, it is difficult for an attacker (reverse engineer) to recognize the secret generation since a large part of the circuit which generates the secret is principally used for a different purpose (e.g., the actual function of the chip).

Specifically, in accordance with various embodiments, parts of existing signal chains in combination with arbiter circuits are used to generate (possibly additional) secret bits. In this case, a secret bit is generated by the length of two signal chains being compared. By way of example, the resulting bit is a zero if the first signal chain is the longer signal chain, and a one if the second signal chain is longer (in each case in the sense of a longer propagation time). This procedure is suitable particularly for chips (e.g., security chips such as dongles, smart cards, hardware roots of trust, wearables . . . ) that are intended to be protected against other attacks (such as laser attacks, etc.), since they typically comprise some signal chains for laser detection, for protection against attacks via the rear side of the chip, rear-side protection, or front-side shielding. In accordance with various embodiments, such existing signal chains (or else signal chains added in a dedicated manner for this purpose) are subdivided into some shorter chains, a signal transition is applied to the inputs of two signal chains resulting from the subdivision, such that it is propagated by the two signal chains, with detection of which of the two signal chains said signal transition propagates through rapidly, and a bit is output in a manner dependent thereon. Since this bit is dependent on various factors (in particular the switching behavior of elements of the chain) that are difficult to recognize by means of reverse engineering, this bit can be regarded as a secret bit.

Figure 2:
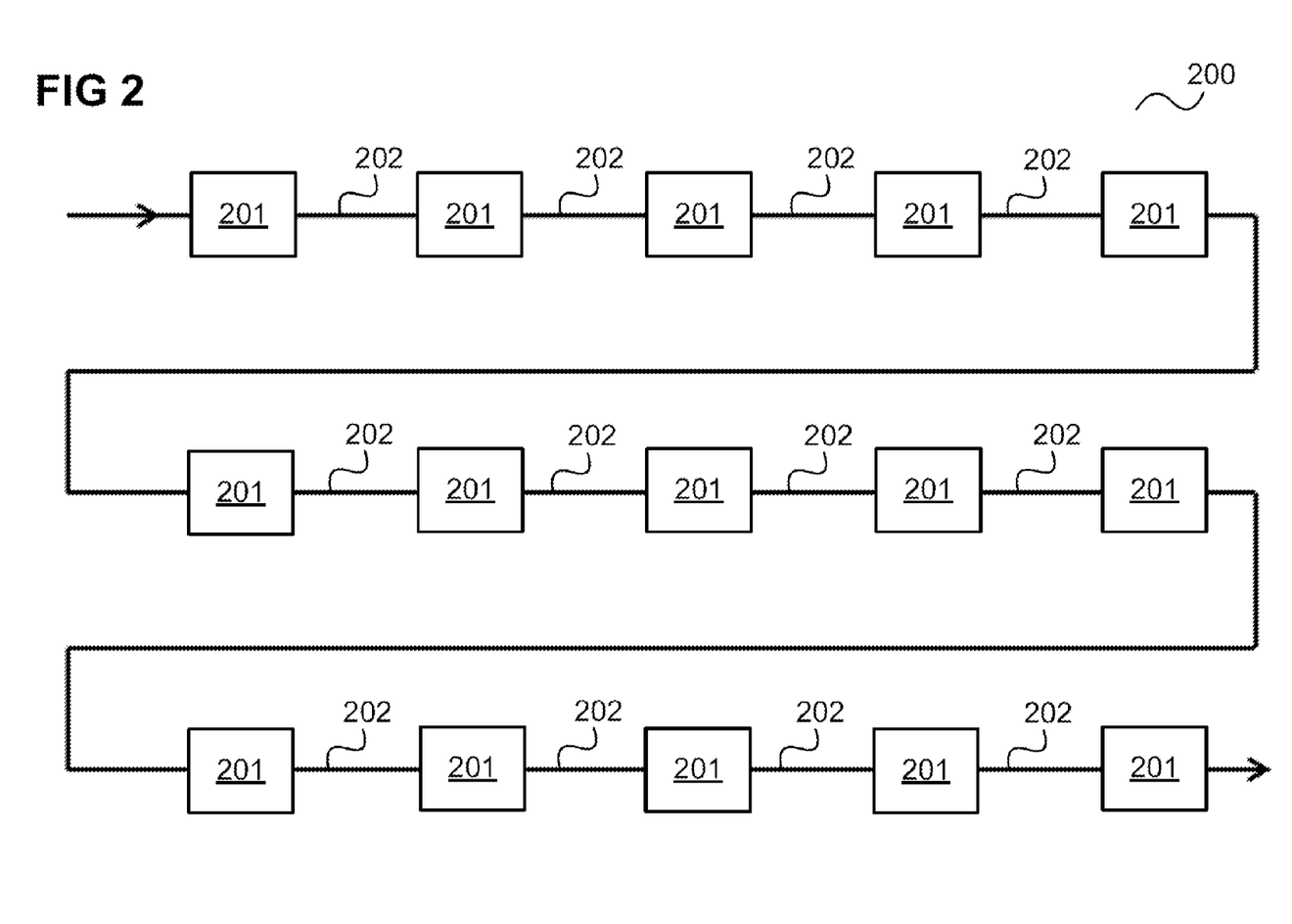
FIG. 2 shows a (existing) signal chain present on a chip.

FIG. 2 shows a (existing) signal chain 200 present on a chip.

The signal chain is formed from circuit elements 201 connected by lines 202. The circuit elements 201 are gates including buffers, inverters, logic gates (such as AND, OR, NOT, etc.).

It is assumed that the signal passes through the signal chain from left to right.

Such a signal chain 200, which is provided on the chip anyway (e.g., even without protection against reverse engineering such as is provided in accordance with various embodiments), is subdivided into a plurality of signal chains, as mentioned above.

However, the signal chain can also be added, that is to say that it need not be a signal chain that is present anyway. This is illustrated for the signal chain 200 in FIG. 3.

Figure 3:
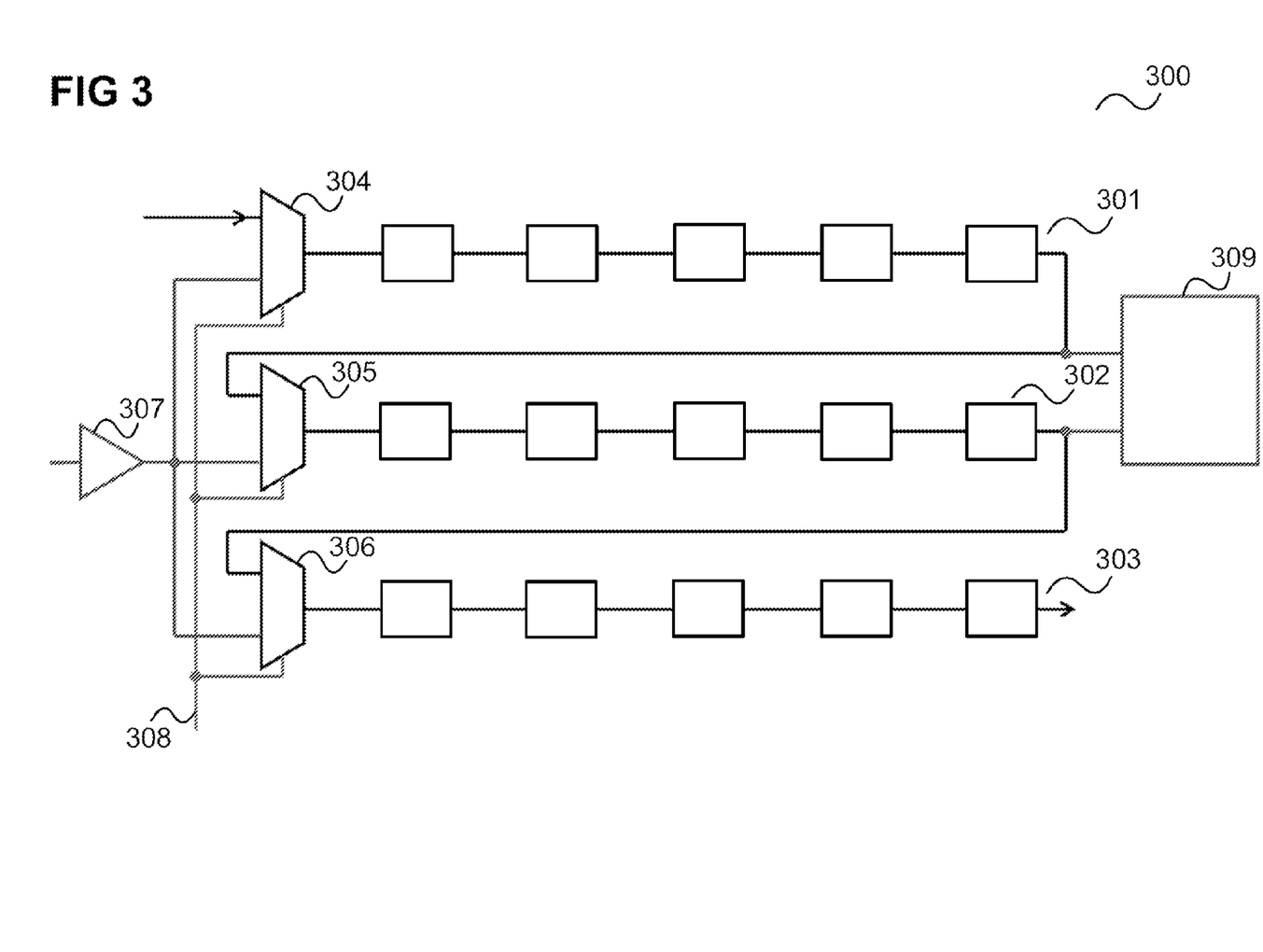
FIG. 3 shows a bit generation circuit based on a subdivision of the signal chain from FIG. 2, such that a plurality of signal chains are formed.

FIG. 3 shows a bit generation circuit 300 based on a subdivision of the signal chain from FIG. 2, such that a plurality of signal chains 301, 302, 303 are formed.

This is done by (input) multiplexers 304, 305, 306 being provided, wherein a respective multiplexer 304, 305, 306 belongs to each signal chain 301, 302, 303, the output of said multiplexer being connected to the input of the respective signal chain. The first data input of each multiplexer 305, 306 is connected to the output of the previous signal chain (according to the arrangement thereof in the original complete signal chain 200), except for the multiplexer 304 of the first signal chain 301, in which the data input of the multiplexer forms the input of the complete signal chain 200 (and is correspondingly connected to the component to which the input of the complete signal chain 200 is to be connected as per the design).

The second data input of each multiplexer 304, 305, 306 is connected to a trigger circuit 307, which triggers the generation of a secret bit.

The control inputs of the multiplexers 304, 305, 306 are connected to a common control line 308. Depending on the level on the control line, the multiplexers switch their first data input through to the output (which yields the normal function of the original (overall) signal chain 200) or switch their second data input through to the output (which enables the generation of secret bits). For this purpose, the control line indicates a normal operating mode or respectively a bit generation mode.

It should be taken into consideration that the formation of a (overall) signal chain if the control line indicates the normal operating mode is merely one example, and even more complex circuits can be correspondingly subdivided by multiplexers, such that the signal chains resulting from the subdivision form the original (complex) circuit in a normal operating mode, and states at the end of the signal chains (and thus, e.g., propagation times through the signal chains or else voltage levels) can be compared in the bit generation mode.

An arbiter circuit 309 is provided in the bit generation circuit 300, said arbiter circuit being connected to the output of the first signal chain 301 and the output of the second signal chain 302. Said arbiter circuit generates a secret bit depending on which signal chain 301, 302 propagates more rapidly a level change generated by the trigger circuit 307. The arbiter circuit 309 does not disturb the operation of the original (overall) signal chain 200.

In accordance with various embodiments, the signal chains 301, 302 are chosen such that the difference between the propagation times through the two signal chains 301, 302 must be sufficiently large and stable so that, for all (expectable) process fluctuations during fabrication (i.e., all process corners), the arbiter circuit 309 outputs the same secret bit. This can be predicted, for example, by means of STA (static timing analysis) or other methods (e.g., Monte Carlo).

Possibilities for setting the propagation times of the signal chains or for attaining propagation time differences between two signal chains are:
  Use of a different number of identical cells (logic gates) within the two signal chains. This yields stable propagation time differences.
  Use of different cell types having different transition times.
  Use of cells (logic gates) that appear identical, i.e., are constructed identically, but have different electronic properties, e.g., transistor threshold voltages, and thus result in different propagation times.

Use of different path lengths from the trigger circuit 307 to the multiplexers 304, 305, 306. If the lines from the trigger circuit 307 to the multiplexers of the two signal chains are long and folded a number of times, it is difficult to detect propagation time differences by reverse engineering.

Use of signal chains extending in a meandering fashion over the chip (e.g., such signal chains used for rear-side protection and for shielding), instead of signal chains extending rectilinearly. Propagation time differences then arise automatically.

Adaptation of path capacities of the signal chains.

Figure 4:
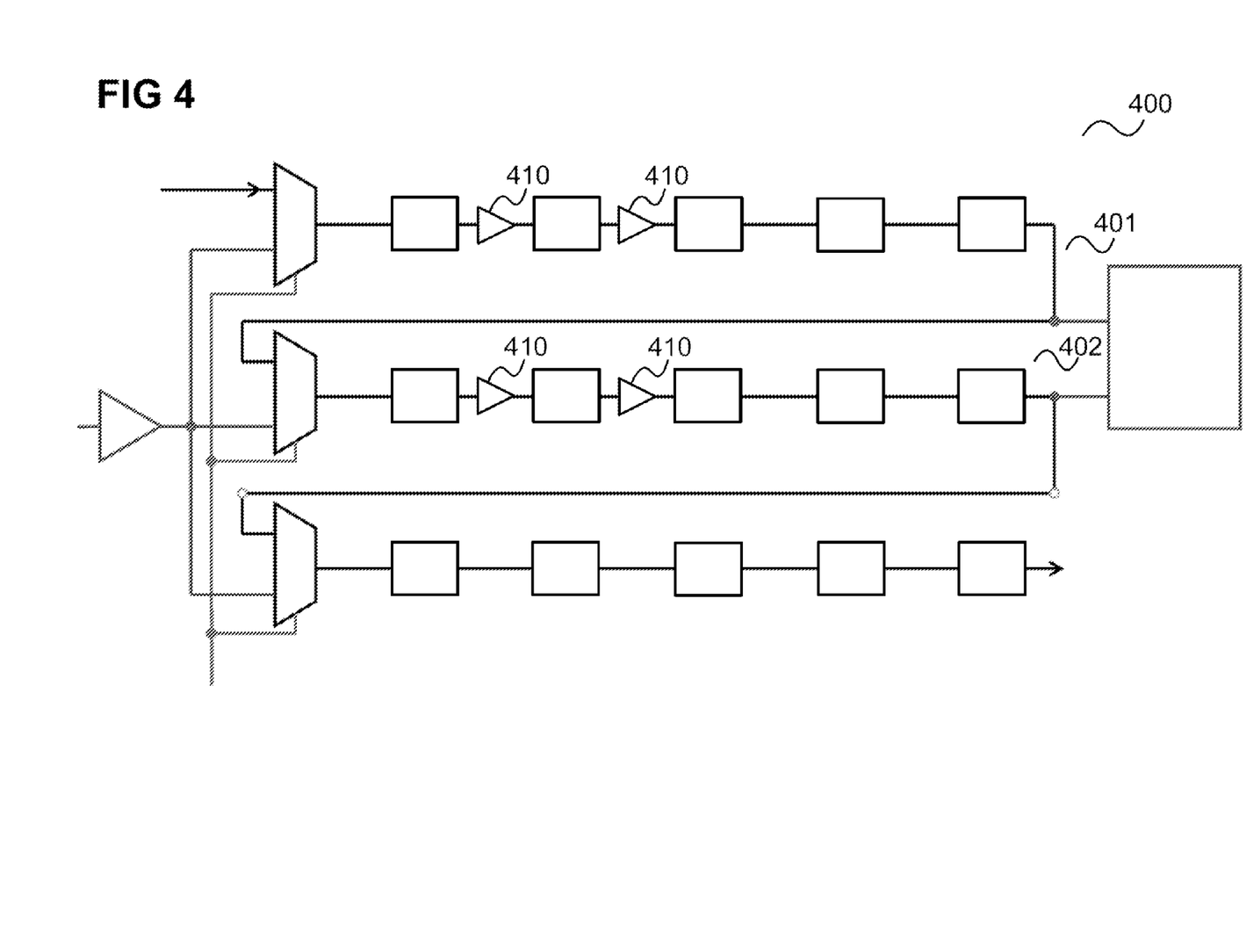
FIG. 4 shows a bit generation circuit corresponding to the bit generation circuit from FIG. 3, wherein delay buffers have been inserted into two signal chains connected to an arbiter circuit.

A further possibility is the insertion of delay buffers, as is illustrated in FIG. 4.

FIG. 4 shows a bit generation circuit 400 corresponding to the bit generation circuit 300 from FIG. 3, wherein delay buffers 410 have been inserted into the two signal chains 401, 402 connected to the arbiter circuit 409.

In a first design step, the delay buffers 410 can be chosen such that the propagation times through the two signal chains 401, 402 are identical, and afterward the secret bit can be programmed by controlled detuning or replacement of cells with optically similar cells having other properties.

It is also possible to use combinations of the abovementioned possibilities for setting the propagation times of the signal chains or for attaining propagation time differences between two signal chains.

By way of example, an RS flip-flop can be used as arbiter circuit.

Figure 5:
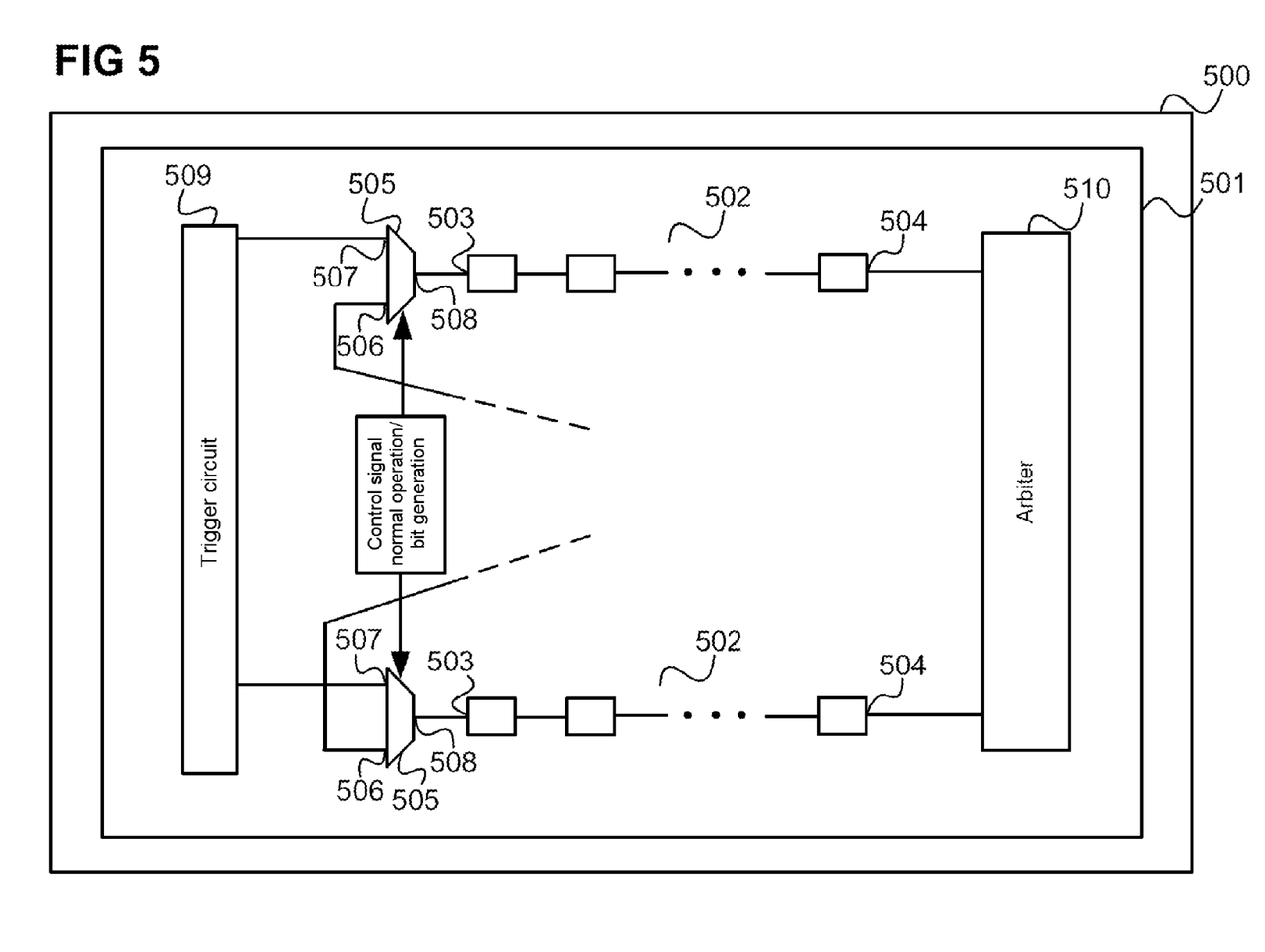
FIG. 5 shows an integrated circuit in accordance with one embodiment.

In summary, in accordance with various embodiments, an integrated circuit as illustrated in FIG. 5 is provided.

FIG. 5 shows an integrated circuit 500 in accordance with one embodiment.

The integrated circuit 500 (e.g., a security chip) comprises at least one bit generation circuit 501.

The bit generation circuit 501 comprises a plurality of signal chains 501, wherein each signal chain comprises a path input 503, a path output 504 and also an input multiplexer 505 having a first data input 506 and a second data input 507 and an output 508 connected to the path input 504 of the signal chain 502.

For each signal chain 502 the first data input 506 of the input multiplexer 505 is connected to another of the signal chains 502, and for each signal chain 502 the input multiplexer is configured in such a way that, if a control signal indicating a normal operating mode is fed to said input multiplexer, said input multiplexer connects the first data input 506 to the path input 503 of the signal chain 502. e.g., such that if a control signal indicating the normal operating mode is fed to the input multiplexers 505, the signal chains 502 form a circuit predefined for normal operation.

The second data input 507 of each input multiplexer 502 is connected to the output of a bit generation trigger circuit 509, and for each signal chain 502 the input multiplexer 505 is configured in such a way that, if a control signal indicating a secret generation mode is fed to said input multiplexer, said input multiplexer connects the second data input 507 to the path input 503 of the signal chain 502.

The bit generation circuit 501 comprises an arbiter circuit 510 connected to the path outputs 504 of at least two of the signal chains 502 and configured to output at least one predetermined secret bit depending on the states of the at least two signal chains.

In accordance with various embodiments, in other words, a circuit (provided for normal operation) in an integrated circuit is subdivided into a plurality of signal chains by means of multiplexers in such a way that a predefined bit is coded (and thus hidden) in a propagation time difference between at least two of the signal chains. The signal chains can be suitably designed (e.g., modified) for this purpose. The integrated circuit functions correctly only if the secret bit is generated correctly. A high number of such secret bits can be hidden in the integrated circuit in this way. Reverse engineering can thus be made more difficult.

Figure 6:
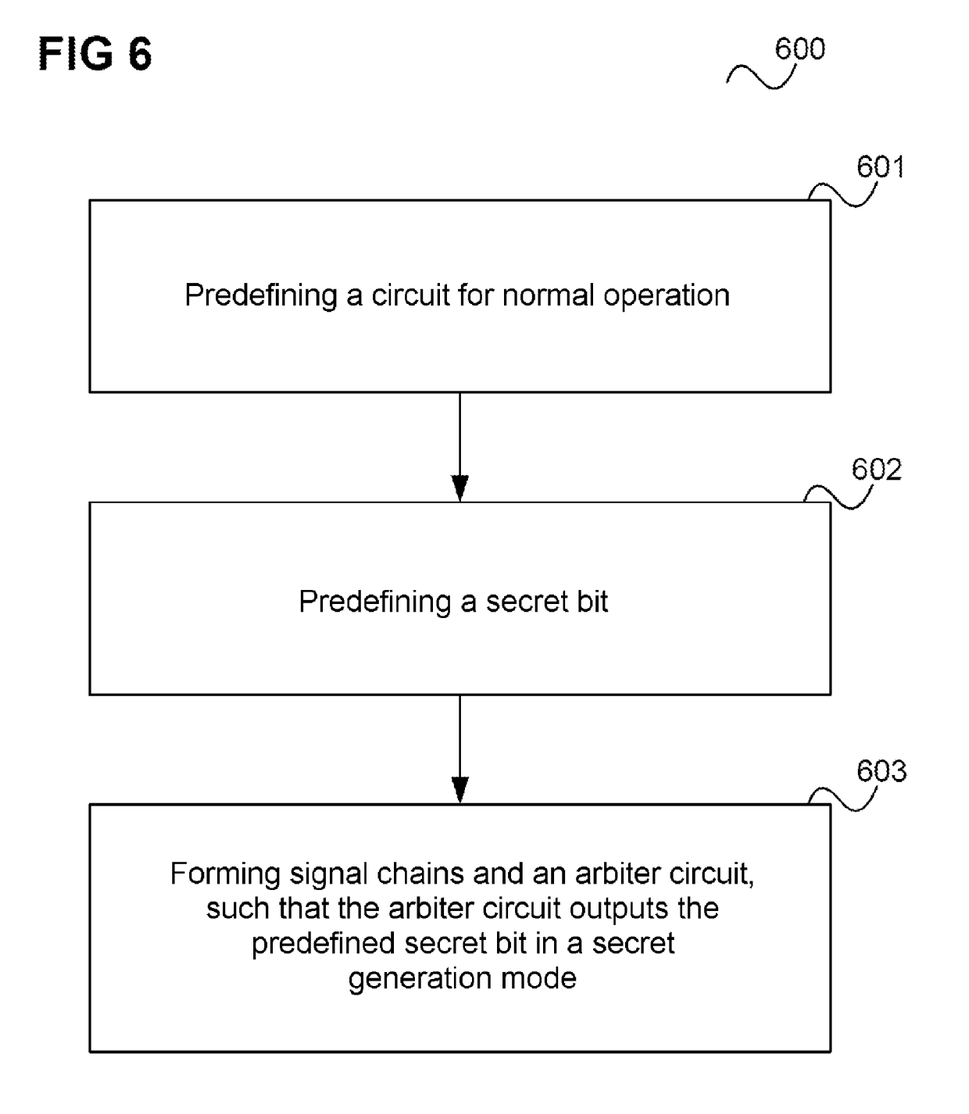
FIG. 6 shows a flow diagram illustrating a method for protecting an integrated circuit against reverse engineering.

In accordance with a further embodiment, a method is provided such as is illustrated in FIG. 6.

FIG. 6 shows a flow diagram 600 illustrating a method for protecting an integrated circuit against reverse engineering.

In 601, a circuit is predefined for normal operation.

In 602, a secret bit is predefined.

In 603, a plurality of signal chains are formed, wherein each signal chain comprises a path input, a path output and also an input multiplexer having a first data input and a second data input and an output connected to the path input of the signal chain, wherein for each signal chain the first data input of the input multiplexer is connected to another of the signal chains and wherein for each signal chain the input multiplexer is configured in such a way that if a control signal indicating a normal operating mode is fed to said input multiplexer, said input multiplexer connects the first data input to the path input of the signal chain, such that, if a control signal indicating the normal operating mode is fed to the input multiplexers, the signal chains form the predefined circuit, and wherein the second data input of each input multiplexer is connected to the output of a bit generation trigger circuit and for each signal chain the input multiplexer is configured in such a way that, if a control signal indicating a secret generation mode is fed to said input multiplexer, said input multiplexer connects the second data input to the path input of the signal chain.

Moreover, in 603, an arbiter circuit is formed, said arbiter circuit being connected to the path outputs of at least two of the signal chains and being configured to output a bit depending on the states of the at least two signal chains.

The at least two signal chains are formed in such a way that the arbiter circuit outputs the predefined secret bit if the bit generation trigger circuit outputs the trigger signal to the at least two signal chains.

Various exemplary embodiments are specified below.

Exemplary embodiment 1 is an integrated circuit as described with reference to FIG. 5.

Exemplary embodiment 2 is an integrated circuit according to exemplary embodiment 1, wherein each signal chain of the sequence of signal chains apart from the last signal chain of the sequence, beginning with the first signal chain of the sequence, is assigned a respective succeeding signal chain by virtue of the path output of the signal chain being connected to a first data input of the input multiplexer of the succeeding signal chain, such that, if a control signal indicating the normal operating mode is fed to the input multiplexers, the signal chains form an overall signal chain.

Exemplary embodiment 3 is an integrated circuit according to exemplary embodiment 1 or 2, wherein each signal chain comprises a chain of a plurality of series-connected gates.

Exemplary embodiment 4 is an integrated circuit according to exemplary embodiment 3, wherein at least some of the gates are delay cells.

Exemplary embodiment 5 is an integrated circuit according to any of exemplary embodiments 1 to 4, wherein the at least two signal chains comprise a different number of gates.

Exemplary embodiment 6 is an integrated circuit according to any of exemplary embodiments 1 to 5, wherein one of the at least two signal chains comprises gates of a different type than the other or the others of the at least two signal chains.

Exemplary embodiment 7 is an integrated circuit according to any of exemplary embodiments 1 to 6, wherein one of the at least two signal chains comprises gates having different threshold voltages than the other or the others of the at least two signal chains.

Exemplary embodiment 8 is an integrated circuit according to any of exemplary embodiments 1 to 7, wherein the arbiter circuit is configured to output at least one predetermined secret bit depending on which of the at least two signal chains propagates a trigger signal output by the bit generation trigger circuit more rapidly to its path output.

Exemplary embodiment 9 is an integrated circuit according to any of exemplary embodiments 1 to 8, comprising a further processing circuit configured to carry out data processing depending on the at least one bit output by the arbiter circuit.

Exemplary embodiment 10 is an integrated circuit according to exemplary embodiment 9, wherein the further processing circuit is configured to put the integrated circuit into an error state if the at least one bit output by the arbiter circuit deviates from at least one predefined bit.

Exemplary embodiment 11 is an integrated circuit according to exemplary embodiment 9 or 10, wherein the further processing circuit is configured to control the bit generation trigger circuit to output the trigger signal.

Exemplary embodiment 12 is an integrated circuit according to any of exemplary embodiments 1 to 11, wherein the lengths of the connecting lines from the output of the bit generation trigger circuit to the input multiplexers of the at least two signal chains are different.

Exemplary embodiment 13 is an integrated circuit according to any of exemplary embodiments 1 to 12, wherein the signal chains are part of rear-side protection, laser detection or shielding.

Exemplary embodiment 14 is a method as described with reference to FIG. 6.

It should be taken into consideration that exemplary embodiments described in association with the integrated circuit can be used analogously in the case of the method.

Although the invention has been shown and described primarily with reference to specific embodiments, it should be understood by those familiar with the technical field that numerous modifications can be made thereto in regard to configuration and details, without departing from the essence and scope of the invention as defined by the claims that follow. The scope of the invention is therefore determined by the appended claims, and the intention is for all modifications which come under the literal sense or the scope of equivalence of the claims to be encompassed.

LIST OF REFERENCE SIGNS

100 Smart card
101 Carrier
102 Smart card module
103 Memory
104 Processor
105 Cryptoprocessor
200 Signal chain
201 Circuit elements
202 Lines
300 Bit generation circuit
301-303 Signal chains
304-306 Multiplexers
307 Trigger circuit
308 Control line
309 Arbiter circuit
400 Bit generation circuit
401, 402 Signal chains
410 Delay buffers
500 Integrated circuit
501 Bit generation circuit
502 Signal chains
503 Path inputs
504 Path outputs
506, 507 Multiplexer data inputs
508 Multiplexer output
509 Bit generation trigger circuit
510 Arbiter circuit
600 Flow diagram
601-603 Sequence steps

What is claimed is:

1. An integrated circuit, comprising:
at least one bit generation circuit, comprising:
a plurality of signal chains, wherein each signal chain comprises a path input, a path output and also an input multiplexer having a first data input and a second data input and an output connected to the path input of the signal chain, wherein for each signal chain the first data input of the input multiplexer is connected to another of the signal chains and wherein for each signal chain the input multiplexer is configured in such a way that if a control signal indicating a normal operating mode is fed to said input multiplexer, said input multiplexer connects the first data input to the path input of the signal chain, and wherein the second data input of each input multiplexer is connected to the output of a bit generation trigger circuit and for each signal chain the input multiplexer is configured in such a way that if a control signal indicating a secret generation mode is fed to said input multiplexer, said input multiplexer connects the second data input to the path input of the signal chain; and
an arbiter circuit connected to the path outputs of at least two of the signal chains and configured to output at least one predetermined secret bit depending on the states of the at least two signal chains.

2. The integrated circuit of claim 1, wherein each signal chain of the sequence of signal chains apart from the last signal chain of the sequence, beginning with the first signal chain of the sequence, is assigned a respective succeeding signal chain by virtue of the path output of the signal chain being connected to a first data input of the input multiplexer of the succeeding signal chain, such that, if a control signal indicating the normal operating mode is fed to the input multiplexers, the signal chains form an overall signal chain.

3. The integrated circuit of claim 1, wherein each signal chain comprises a chain of a plurality of series-connected gates.

4. The integrated circuit of claim 3, wherein at least one portion of the gates are delay cells.

5. The integrated circuit of claim 1, wherein the at least two signal chains comprise a different number of gates.

6. The integrated circuit of claim 1, wherein one of the at least two signal chains comprises gates of a different type than the other or the others of the at least two signal chains.

7. The integrated circuit of claim 1, wherein one of the at least two signal chains comprises gates having different threshold voltages than corresponding gates in the other or the others of the at least two signal chains.

8. The integrated circuit of claim 1, wherein the arbiter circuit is configured to output at least one predetermined secret bit depending on which of the at least two signal chains propagates a trigger signal output by the bit generation trigger circuit more rapidly to its path output.

9. The integrated circuit of claim 1, comprising a further processing circuit configured to carry out data processing depending on the at least one bit output by the arbiter circuit.

10. The integrated circuit of claim 9, wherein the further processing circuit is configured to put the integrated circuit into an error state if the at least one bit output by the arbiter circuit deviates from at least one predefined bit.

11. The integrated circuit of claim 9, wherein the further processing circuit is configured to control the bit generation trigger circuit to output the trigger signal.

12. The integrated circuit of claim 1, wherein the lengths of the connecting lines from the output of the bit generation trigger circuit to the input multiplexers of the at least two signal chains are different.

13. The integrated circuit of claim 1, wherein the signal chains are part of rear-side protection, laser detection or shielding.

14. A method for protecting an integrated circuit against reverse engineering, comprising:
predefining a circuit for normal operation;
predefining a secret bit;
forming a plurality of signal chains, wherein each signal chain comprises a path input, a path output and also an input multiplexer having a first data input and a second data input and an output connected to the path input of the signal chain, wherein for each signal chain the first data input of the input multiplexer is connected to another of the signal chains and wherein for each signal chain the input multiplexer is configured in such a way that if a control signal indicating a normal operating mode is fed to said input multiplexer, said input multiplexer connects the first data input to the path input of the signal chain, such that, if a control signal indicating the normal operating mode is fed to the input multiplexers, the signal chains form the predefined circuit, and wherein the second data input of each input multiplexer is connected to the output of a bit generation trigger circuit and for each signal chain the input multiplexer is configured in such a way that, if a control signal indicating a secret generation mode is fed to said input multiplexer, said input multiplexer connects the second data input to the path input of the signal chain; and
forming an arbiter circuit connected to the path outputs of at least two of the signal chains and configured to output a bit depending on the states of the at least two signal chains,
wherein the at least two signal chains are formed in such a way that the arbiter circuit outputs the predefined secret bit if the bit generation trigger circuit outputs the trigger signal to the at least two signal chains.

15. The method of claim 14, wherein each signal chain of the sequence of signal chains apart from the last signal chain of the sequence, beginning with the first signal chain of the sequence, is assigned a respective succeeding signal chain by virtue of the path output of the signal chain being connected to a first data input of the input multiplexer of the succeeding signal chain, such that, if a control signal indicating the normal operating mode is fed to the input multiplexers, the signal chains form an overall signal chain.

16. The method of claim 14, wherein each signal chain is formed in such a way that it comprises a chain of a plurality of series-connected gates.

17. The method of claim 16, wherein at least one portion of the gates are delay cells.

18. The method of claim 14, wherein the signal chains are formed in such a way that the at least two signal chains comprise a different number of gates.

19. The method of claim 14, wherein the signal chains are formed in such a way that one of the at least two signal chains comprises gates of a different type than the other or the others of the at least two signal chains.

20. The method of claim 14, wherein the signal chains are formed in such a way that one of the at least two signal chains comprises gates having different threshold voltages than corresponding gates in the other or the others of the at least two signal chains.

* * * * *